(12) United States Patent
Shick et al.

(10) Patent No.: US 9,975,517 B2
(45) Date of Patent: May 22, 2018

(54) VEHICLE RESTRAINT APPARATUS AND METHODS OF USE AND MANUFACTURE THEREOF

(71) Applicant: Honda Motor Co., Ltd., Tokyo (JP)

(72) Inventors: Kenneth Alan Shick, Marysville, OH (US); Randy A. Staib, Worthington, OH (US); James J. Yang, Powell, OH (US); Tadashi Sato, Tochigi (JP); Dwayne William Malone, Delaware, OH (US); Tetsuji Fukushima, Nasukarasuyama (JP); Cory J. Perriton, West Bloomfield, MI (US); Timothy D. Boxell, Southfield, MI (US); Todd S. Przybylo, Grand Blanc, MI (US); Michael J. Aittama, Fenton, MI (US)

(73) Assignees: HONDA MOTOR CO., LTD., Tokyo (JP); GRUPO ANTOLIN INGENIERIA, S.A., Burgos (ES)

( * ) Notice: Subject to any disclaimer, the term of this patent is extended or adjusted under 35 U.S.C. 154(b) by 21 days.

(21) Appl. No.: 15/136,423

(22) Filed: Apr. 22, 2016

(65) Prior Publication Data

US 2017/0305379 A1 Oct. 26, 2017

(51) Int. Cl.
*B60R 21/2165* (2011.01)
*B60R 21/205* (2011.01)

(52) U.S. Cl.
CPC ........ *B60R 21/2165* (2013.01); *B60R 21/205* (2013.01)

(58) Field of Classification Search
CPC .......................... B60R 21/2165; B60R 21/205
See application file for complete search history.

(56) References Cited

U.S. PATENT DOCUMENTS 5,131,678 A * 7/1992 Gardner .............. B60R 21/2165
264/293
5,221,108 A    6/1993 Hirabayashi
(Continued)

FOREIGN PATENT DOCUMENTS

DE         19541440 B4    9/2005
FR          2912103 A1 *  8/2008  ........... B60R 21/207

OTHER PUBLICATIONS

Thevenot et al., Seat for motor vehicle, has maintaining seam including stop portion provided with back stitch and extending into one of parts of lining, where seam has maintaining portion extending into parts of lining, France, FR 2 912 103 A1, Machine Translation of Description.*

(Continued)

*Primary Examiner* — James A English
(74) *Attorney, Agent, or Firm* — Kenealy Vaidya LLP

(57) ABSTRACT

Some embodiments are directed to an assembly for housing and covering a vehicle airbag in an un-deployed state. The assembly can include a hollow housing that defines an interior that is configured to house the airbag in the un-deployed state. The housing can include a door having a linearly extending primary weakened portion spanning longitudinally opposing ends of the housing. The housing door can also include a pair of angled seams that each extend proximate the primary weakened portion to a location adjacent opposing corners of the door. The assembly can also include an intermediate layer disposed over and joined to the housing door, and an exterior layer disposed over and joined to the intermediate layer.

33 Claims, 8 Drawing Sheets

(56) References Cited

U.S. PATENT DOCUMENTS

| | | | |
|---|---|---|---|
| 5,342,088 A | 8/1994 | Bauer | |
| 5,449,197 A | 9/1995 | Kerner | |
| 5,632,914 A * | 5/1997 | Hagenow | B29C 59/007 |
| | | | 219/121.71 |
| 5,961,143 A | 10/1999 | Hlywka et al. | |
| 6,074,003 A | 6/2000 | Umezawa et al. | |
| 6,550,803 B1 * | 4/2003 | Derrick | B60R 21/2165 |
| | | | 280/728.3 |
| 6,669,229 B2 | 12/2003 | Thomas | |
| 6,692,019 B2 | 2/2004 | Sommer | |
| 6,793,238 B2 * | 9/2004 | Schneider | B60R 21/21656 |
| | | | 280/728.2 |
| 7,014,209 B2 | 3/2006 | Muller et al. | |
| 7,156,414 B2 * | 1/2007 | Hayashi | B60R 21/2165 |
| | | | 280/728.3 |
| 7,367,583 B2 | 5/2008 | Gayer et al. | |
| 7,900,956 B2 | 3/2011 | Megliola et al. | |
| 7,918,481 B2 | 4/2011 | Ohgo et al. | |
| 7,967,329 B2 | 6/2011 | Daita et al. | |
| 7,989,052 B2 | 8/2011 | Hehn et al. | |
| 8,210,567 B2 | 7/2012 | Wieczorek et al. | |
| 8,215,666 B2 * | 7/2012 | Fukawatase | B60R 21/206 |
| | | | 280/728.3 |
| 8,262,130 B2 | 9/2012 | Fischer et al. | |
| 9,045,107 B2 * | 6/2015 | Kim | B60R 21/2165 |
| 9,296,354 B1 * | 3/2016 | Preisler | B60R 21/215 |
| 2003/0178818 A1 * | 9/2003 | Schneider | B60R 21/21656 |
| | | | 280/728.3 |
| 2004/0160043 A1 * | 8/2004 | Litjens | B29C 43/021 |
| | | | 280/732 |
| 2011/0018241 A1 * | 1/2011 | Wagner | B60R 21/2165 |
| | | | 280/728.3 |
| 2014/0110921 A1 | 4/2014 | Takahashi et al. | |
| 2014/0333052 A1 * | 11/2014 | Fujita | B60R 21/2165 |
| | | | 280/728.3 |

OTHER PUBLICATIONS

Thevenot et al., Seat for motor vehicle, has maintaining seam including stop portion provided with back stitch and extending into one of parts of lining, where seam has maintaining portion extending into parts of lining, France, FR 2 912 103 A1, Derwent Translation.*

* cited by examiner

VEHICLE RESTRAINT APPARATUS AND METHODS OF USE AND MANUFACTURE THEREOF

BACKGROUND

The disclosed subject matter relates to methods and apparatus for restraining vehicular passengers. More particularly, the disclosed subject matter relates to vehicular airbags and airbag systems, methods of inflating vehicular airbags, and methods of manufacturing vehicular airbags and airbag systems.

Vehicles can be provided with various systems and apparatus for restraining vehicular passengers, such as in the event of a collision. For example, some related art vehicles are provided with airbags that inflate if forces are sensed or otherwise detected that indicate a collision or other event that may transmit potentially harmful forces to a vehicular passenger. Under these conditions, the airbag is rapidly inflated for the purpose of restraining the vehicular passenger to prevent or reduce injuries, such as by providing a buffer between the passenger and other objects, e.g., portions of the vehicle's interior. As one example, in the event of a vehicular front collision, the airbag is configured and oriented to deploy between the passenger and a portion of the vehicular interior immediately in front of the passenger. The forces resulting from the collision cause the passenger to move forward and contact the airbag instead of portions of the vehicular interior that would otherwise be contacted, thereby reducing, mitigating or preventing passenger injuries.

SUMMARY

Typical airbag systems include an inflatable airbag disposed within an interior portion of a hollow housing or chute when the airbag is in an un-deployed or folded state. The interior portion of the housing can be defined by four sides, and a top chute door. Many of these housings are configured so that at least a portion of the airbag can exit the chute via the chute door so as to be deployed within the passenger compartment, e.g., to deploy between the passenger and a portion of the vehicle interior immediately in front of the passenger.

In some airbag systems, the airbag is inflated while being disposed within the chute, and the chute door is configured to tear to allow the airbag to pass therethrough and thereby become deployed within the passenger compartment. It may therefore be beneficial for the chute door to be configured to effectively retain the airbag in its un-deployed and folded state, but to effectively and efficiently tear as the airbag is inflated. In some cases, it is beneficial for the chute door to be configured to provide reduced or minimal resistance or impedance of the airbag as it is in the act of deployment so that the chute door and airbag may open in a predetermined manner.

Some chute doors include a longitudinally extending seam that extends from one longitudinal end of the chute door to the opposing longitudinal end, and that is configured to tear as the airbag is inflated. This tearing thereby divides the chute door into opposing sides with a gap therebetween, thereby allowing the inflating airbag to pass through the gap into the passenger compartment. Embodiments are intended to include any and all seam structures and seam locations to facilitate this separation. In some embodiments, the longitudinal seam extends at an angle relative to the direction of elongation of the chute door. For example, the longitudinal seam can extend diagonally across a rectangular chute door. In some of these embodiments, each end of the longitudinal seam terminates at or adjacent a corner of the chute door.

In some embodiments, the chute door defines other seams or areas of weakness in addition to the longitudinal seam. For example, two smaller seams or areas of weakness (angled seams) can be provided to extend from the longitudinal seam to opposing corners of the chute door. In some of these embodiments, the smaller angled seams or areas of weakness each terminate at or adjacent a corner of the chute door. In some of these embodiments, the smaller angled seams or areas of weakness can be defined by a series of spaced perforations. In some of these cases, the spaced perforations can be generally elliptically shaped with opposing pointed longitudinal ends.

The above structures of the longitudinal seam and smaller seams or areas of weakness may be beneficial for various reasons. For example, these structures may facilitate deployment of the airbag with reduced resistance or impedance so that the airbag may open in a predetermined manner. In addition, these seams or areas of weakness may interact with other airbag assembly components, such as other layers, to achieve the above and other advantages, such as to facilitate a smooth and more regular exterior appearance, e.g., for aesthetics.

The airbag assembly may include other layers, including a layer disposed over or directly on the chute door. This layer may be an intermediate layer and can be formed of any material and fashioned into any configuration. In some embodiments, the intermediate layer is formed of fabric and can be termed a spacer fabric layer. The intermediate layer may be formed as a unitary sheet having perforations over the longitudinal seal of the chute door. Alternatively, the intermediate layer can be formed of two separate sheets that are separated at a location over the longitudinal seal of the chute door. In other words, the longitudinal seam can be contiguous with the perforations in the unitary sheet or the gap separating the two separate sheets of the intermediate layer. This layer may be advantageous for several reasons, such as to enhance aesthetics and/or haptics of the airbag assembly by facilitating a relatively smooth and regular exterior appearance and/or feel.

The airbag assembly may also include an exterior layer that is disposed over or directly on the intermediate layer. This exterior layer may be exposed to the passenger compartment and be configured to enhance aesthetics. In some of these embodiments, the exterior layer includes an exterior seam that is disposed proximate the longitudinal seam of the chute door and the gap separating the separate sheets of the intermediate layer. For example, the exterior seam can extend directly over the longitudinal seam and the gap to thereby facilitate deployment of the airbag upon inflation.

Embodiments are intended to include or otherwise cover any exterior seam configuration. In some embodiments, the seam includes a burst stitch, and a pair of backstitch portions disposed at opposing ends of the burst stitch. The burst stitch can be formed using a relatively weak thread, which allows the airbag to rip apart the burst stitch during deployment. The backstitch portions can be formed using a relatively stronger thread that stops or impedes further separation of the exterior layer, i.e., separation beyond the burst stitch.

In some embodiments, the exterior layer is formed of a material and otherwise configured to enhance aesthetics. For example, the exterior layer can be formed of leather, and may not include other seams or similar structures over the smaller seams or areas of weakness (angled seams) of the chute door. Instead, the exterior layer can be formed of a material (leather) that is sufficiently weak over the smaller seams or areas of weakness (angled seams) to naturally tear and facilitate airbag deployment. This configuration may enhance aesthetics, such as by enhancing a relatively smooth and regular appearance.

Some embodiments are therefore directed to an assembly for housing and covering a vehicle airbag in an un-deployed state. The assembly can include a hollow housing that defines an interior that is configured to house the airbag in the un-deployed state. The housing can include a door having a linearly extending primary weakened portion spanning longitudinally opposing ends of the housing. The housing door can also include a pair of angled seams that each extend proximate the primary weakened portion to a location adjacent opposing corners of the door. The assembly can also include an intermediate layer disposed over and joined to the housing door so that the intermediate layer is configured to separate along separation portions adjacent the primary weakened portion and the pair of angled seams, and an exterior layer disposed over and joined to the intermediate layer so that the exterior layer is configured to separate along separation portions of the intermediate layer.

Some other embodiments are directed to a vehicle dashboard assembly that includes a center console, and a dashboard having a center dashboard portion disposed above the center console and a passenger dashboard portion. The passenger dashboard portion includes an airbag assembly having an airbag and a housing assembly that is configured to house and cover the airbag in an un-deployed state. The airbag assembly can include a hollow housing that defines an interior that is configured to house the airbag in the un-deployed state. The housing can include a door having a linearly extending primary weakened portion spanning longitudinally opposing ends of the housing. The housing door can also include a pair of angled seams that each extend proximate the primary weakened portion to a location adjacent opposing corners of the door. The airbag assembly can also include an intermediate layer disposed over and joined to the housing door so that the intermediate layer is configured to separate along separation portions adjacent the primary weakened portion and the pair of angled seams, and an exterior layer disposed over and joined to the intermediate layer so that the exterior layer is configured to separate along separation portions of the intermediate layer.

Still other embodiments are directed to a method of manufacturing an assembly for housing and covering a vehicle airbag in an un-deployed state. The method can include: configuring a hollow housing to define an interior capable of housing the airbag in the un-deployed state; forming the housing to include a door having a linearly extending primary weakened portion spanning longitudinally opposing ends of the housing and extending at an angle relative to a longitudinal direction of the housing, and such that the housing door also includes a pair of angled seams that each extend proximate the primary weakened portion to a location adjacent opposing corners of the door; disposing an intermediate layer over the housing door; disposing an exterior layer over the intermediate layer; and forming a stitched portion in the exterior layer directly over at least a section of the primary weakened portion of the housing door.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Certain embodiments of airbag assembly 40 are disclosed below, and FIGS. 1-20 illustrate some of these embodiments. However, embodiments are intended to include or otherwise cover many different embodiments and structures for facilitating airbag deployment.

The embodiments are disclosed below and in the context of an airbag assembly of an automobile. However, the embodiments are intended to be applicable to any automobile airbag assembly, any type of automobile, and any type of vehicle, and to further be applicable to non-vehicular safety systems.

Embodiments are also disclosed below in the context of a passenger airbag (PAB) assembly, and specifically a dashboard airbag. However, embodiments are intended to include or otherwise cover any type of airbag assembly, including assemblies for front airbags such as steering wheel and other types of dashboard airbags, side curtain airbags, knee airbags, and other types of side airbags such as torso airbags.

I. Vehicle and Airbag Lid Assembly

Figure 1:
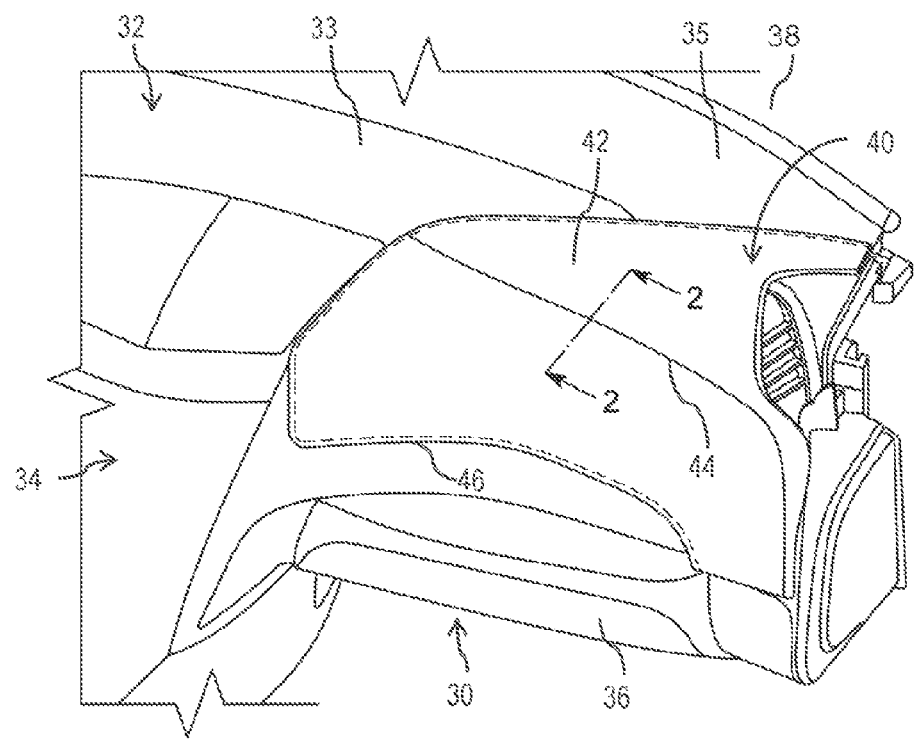
FIG. 1 is a perspective view of part of a dashboard of an exemplary vehicle in accordance with the disclosed subject matter, the dashboard including a passenger airbag assembly therein.

FIG. 1 is a partial perspective view of a vehicle 30 showing parts of a dashboard 32 and a center console 34. The vehicle 30 shown in FIG. 1 is primarily for use on paved roadways, and can be referred to as a passenger vehicle. However, as indicated above, the disclosed airbag assembly 40 can be used with any vehicle that is configured to travel along any one or combination of improved, unimproved, and unmarked roadways and paths constituted by gravel, dirt, sand, etc. For example, embodiments are intended to include or otherwise cover any other type of automobile, including passenger car, truck, ATV, etc. In fact, embodiments are intended to include or otherwise cover configurations of the airbag assembly 40 for use in any other type of vehicle, such as an aircraft, boat, ship, train, spacecraft, etc. Some other embodiments can be used in non-vehicular carrier applications, such as for amusement park rides or any other situation where airbag deployment can enhance outcomes subsequent to transmission of a force.

The exemplary vehicle 30 can include the dashboard 32 having portions comprising a center dashboard portion 33 and a passenger dashboard portion 35 being provided adjacent each other. The center console 34 can be provided below the center dashboard portion 33, and may extend between passenger and driver seats. The passenger dashboard portion 35 can include the airbag assembly 40, as well as a glove compartment 36 or other storage means such as a shelf. The glove compartment 36 can be provided below the airbag assembly 40, or may alternatively be provided in front of the airbag assembly 40. In the embodiment shown in FIG. 1, the airbag assembly 40 is provided at an upper portion of the passenger dashboard portion 35 such that a top layer 42 of the airbag assembly 40 serves as an upper surface of the passenger dashboard portion 35.

However, the various embodiments are intended to include or otherwise cover any configuration or position of the airbag assembly 40, such as but not limited to the airbag assembly 40 being included in the center dashboard portion 33, a driver dashboard portion (not shown), the center console 34, or driver or passenger side doors (not shown). The airbag assembly 40 may also be included in a steering wheel, a seat, vehicle pillars, a roof, or any other vehicle component capable of deploying an airbag. In other words, the airbag assembly 40 can be formed within any component of the vehicle 30 capable of deploying an airbag.

The exemplary airbag assembly 40 can be configured as a passenger airbag assembly intended to protect occupants from frontal impacts in the event of a vehicular collision. For example the passenger airbag assembly may be especially beneficial to protect occupants from contacting a front portion of the interior of the vehicle, such as the dashboard 32, in the event of a front of the vehicle colliding with an object (or in accordance with any other event that may create a force resulting in the occupant colliding with the front portion of the interior of the vehicle, such as the dashboard).

As discussed in more detail below, some embodiments are intended to include panels and perforated seams that enable the airbag assembly 40 to tear at the seams and fold open via the panels to safely facilitate deployment of the airbag.

II. Airbag Assembly Structure

As described above, FIG. 1 shows the airbag assembly 40 provided in the dashboard 32 of the vehicle 30. The top layer 42 of the airbag assembly 40 is defined around an exterior edge by a top layer perimeter 46, the top layer perimeter 46 extending from a part of the passenger dashboard portion 35 adjacent the glove compartment 36 to a part of the passenger dashboard portion 35 proximate a windshield 38. The top layer 42 may be clipped to secured structures of dashboard 32, or to other components of the airbag assembly 40 that will be described below. The top layer perimeter 46 can include stitching for increased aesthetics.

The top layer 42 also can also a top seam 44 extending through an interior portion of the top layer 42, the top seam 44 defining a character line of the dashboard 32. The top seam 44 can extend from a side of the top layer 42 to an opposite side, or may alternatively span any two edges of the top layer perimeter 46. Additionally, the top seam 44 may separate two panels of the top layer 42, with the panels being coplanar, or alternatively with the panels extending along distinct yet intersecting planes, with the top seam 44 defining the intersection between them. In the present embodiment, a lower panel is provided proximate the glove compartment 36 while an upper panel is provided proximate the windshield 38, the top seam 44 extending between the two panels from a portion of the top layer 42 adjacent the center dashboard portion 33 to a portion adjacent the passenger door (not shown). In some embodiments, the top layer 42 includes sections weakened or perforated sections made of the same construction, rather than the top seam 44 and first and second angled lines 49A,B, as shown and described below.

Figure 2:
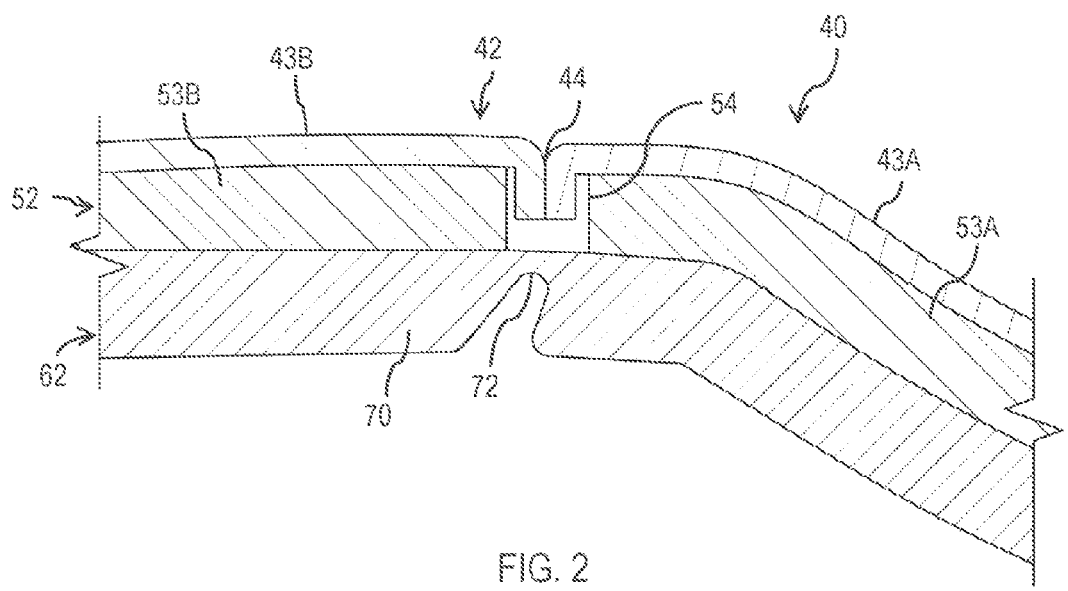
FIG. 2 is a side view of a cross section of the passenger airbag assembly of FIG. 1.

FIG. 2 illustrates an embodiment of the airbag assembly 40 including the top layer 42, a spacer layer 52, and a substrate layer 62. In the present embodiment, the top layer 42 is shown divided into a first top panel 43A and a second top panel 43B, the first and second top panels 43A,B being adjacent to each other and joined at the top seam 44. The first top panel 43A is contoured to slope downward away from the seam 44, while the second top panel 43B is approximately planar. However, other configurations of the first and second top panels 43A,B are possible, such as but not limited to configurations in which both the first and second top panels 43A,B are planar, or both are contoured to slope. The second top panel 43B may also be sloped while the first top panel 43A is planar. The top layer 42 can be formed of leather material such as genuine leather, artificial leather, suede, artificial suede, etc., and can be applied by hand wrapping to the spacer layer 52, which is described below.

The top seam 44 of the present embodiment is defined by opposing ends of the first and second top panels 43A,B that are folded so as to point downwards towards the spacer layer 52. Since the first and second top panels 43A,B are pointed downwards at opposing ends, portions of upper surfaces of each panel extending along the top seam 44 contact each other. The extent of contact between the portions of the first and second top panels 43A,B extending along the top seam 44 can be relatively large or small, being dependent upon the method of bonding between the first and second top panels 43A,B at the top seam 44. Folded ends of the first and second top panels 43A,B that form the top seam 44 may be stitched together by any appropriate stitching method such as burst stitching formed of relatively weak thread so that the stitching is configured to loosen and/or tear and separate from a predetermined force, or otherwise attached by alternate means having similar separation qualities.

In the present embodiment, the spacer layer 52 is disposed underneath of and adjacent the top layer 42 such that an upper surface of the spacer layer 52 is contoured to a lower, touching surface of the top layer 42. Similarly, the spacer layer 52 includes a first spacer panel 53A and a second spacer panel 53B contacting the first top panel 43A and the second top panel 43B, respectively. In this way, the first and second spacer panels 53A,B can be planar or sloped so as to match the configuration of the first and second top panels 43A,B that they contact. The first and second spacer panels 53A,B are separated by a seam gap 54, the seam gap 54 spanning a distance approximately equal to a distance the top seam 44 of the top layer 42 extends. In the present embodiment, the top seam 44 is disposed within the seam gap 54 when then top layer 42 is overlaid onto the spacer layer 54. Particularly, the seam gap 54 defines an elongated space, or channel, through which the top seam 44 extends.

The present embodiment also includes the substrate layer 62 disposed underneath of and adjacent the spacer layer 52 such that an upper surface of the substrate layer 52 is contoured to a lower, touching surface of the spacer layer 52. The substrate layer 62 can be planar or sloped so as to match the configuration of the first and second spacer panels 53A,B that it contacts.

Specifically, and as shown in more detail in FIG. 5, the substrate layer 62 can include a chute 70 disposed within a substrate surround 64, the chute 70 shown in FIG. 2 and the substrate surround 64 described below. The chute 70 can include a chute seam 72 of decreased thickness such that the chute 70 is thinner at the chute seam 72 than at other surrounding portions of the chute 70. In the present embodiment, the chute seam 72 defines a concave space open to a lower surface of the substrate layer 62, particularly the chute 70. However, other embodiments may include the chute seam 72 being a concave space open to an upper surface of the substrate layer 62, or particularly the chute 70. The chute seam 72 can be disposed at a portion of the chute 70 proximate the seam gap 54 and the top seam 44 contained within.

Figure 3:
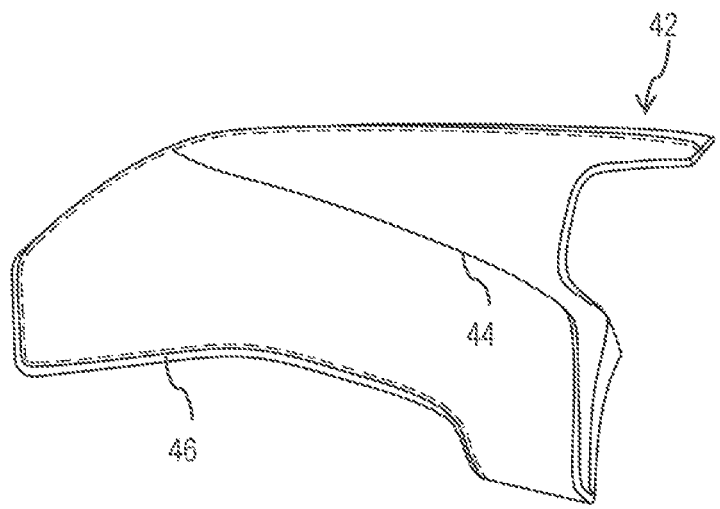
FIG. 3 is a perspective view of a cover layer of the passenger airbag assembly of FIG. 1.

FIG. 3 illustrates a perspective view of the top layer 42 of the airbag assembly 40 in accordance with principles of the disclosed subject matter.

Figure 4:
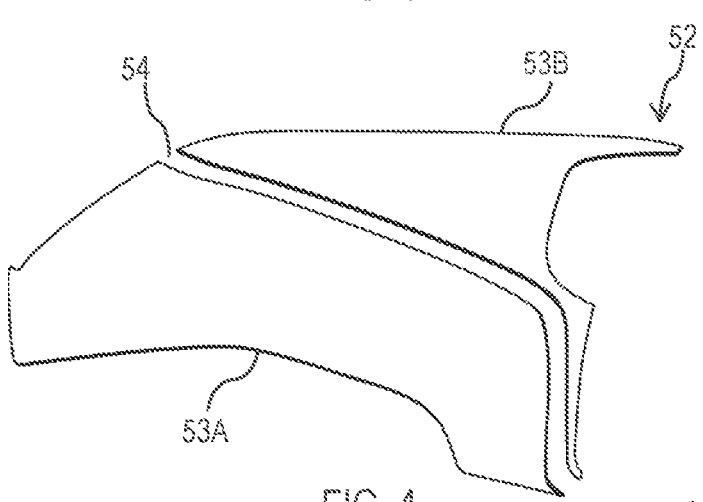
FIG. 4 is a perspective view of a spacer layer of the passenger airbag assembly of FIG. 1.

FIG. 4 illustrates a perspective view of the spacer layer 52 of the airbag assembly 40 in accordance with principles of the disclosed subject matter. In the present embodiment, the spacer layer 52 includes the first and second spacer panels 53A,B separated by the seam gap 54.

Figure 5:
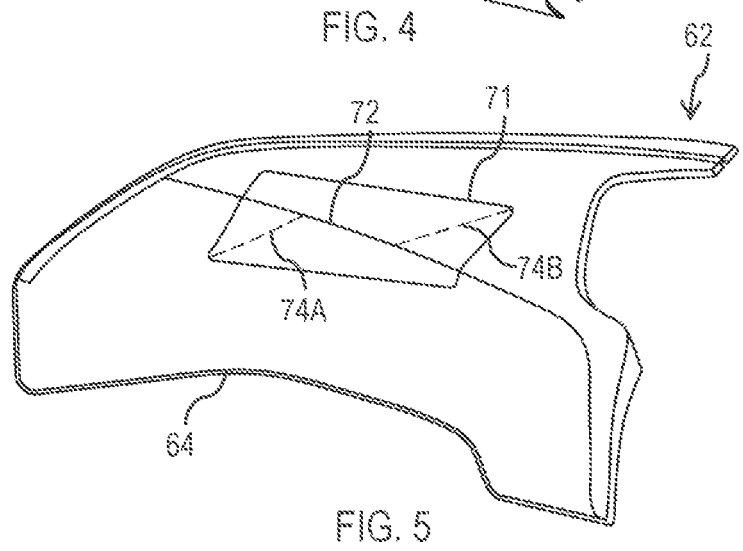
FIG. 5 is a perspective view of a substrate layer and a chute portion of the passenger airbag assembly of FIG. 1.

FIG. 5 illustrates a perspective view of the substrate layer 62 of the airbag assembly 40 in accordance with the principles of the disclosed subject matter. The substrate layer 62 includes the chute 70 disposed within the substrate surround 64. As described below, the chute 70 is defined by a chute perimeter 71 within which the chute seam 72 and first and second chute perforations 74A,B are disposed. The chute 70 may be positioned at an intermediate part of the substrate layer 62 such that the chute perimeter 71 is spaced from exterior edges of the substrate surround 64. In some embodiments, the chute 70 and the substrate layer 62 can be formed by dual injection molding. In other embodiments, the chute 70 is configured so as to be insertable and snugly fit within a substrate aperture 66 disposed at the intermediate part of the substrate layer 62.

Figure 6:
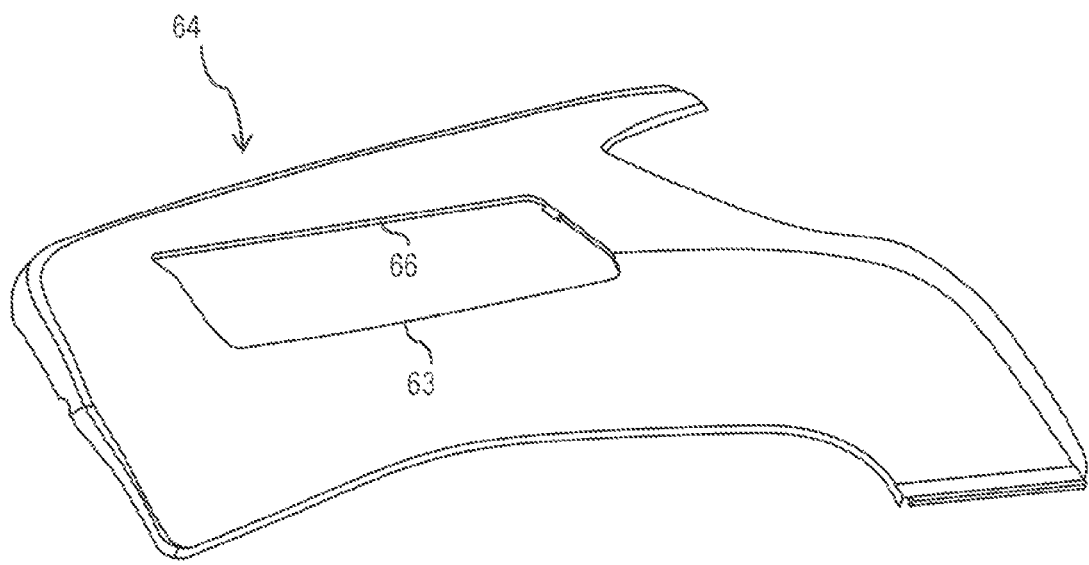
FIG. 6 is a perspective view of the substrate layer of the passenger airbag assembly of FIG. 5.

FIG. 6 a perspective view of the substrate surround 64 of the substrate layer 62 in accordance with the principles of the disclosed subject matter. As shown in FIG. 6, the present embodiment includes the substrate aperture 66 disposed at the intermediate portion of the substrate layer 62 and spaced from a substrate perimeter 63 to define the substrate surround 64.

Figure 7:
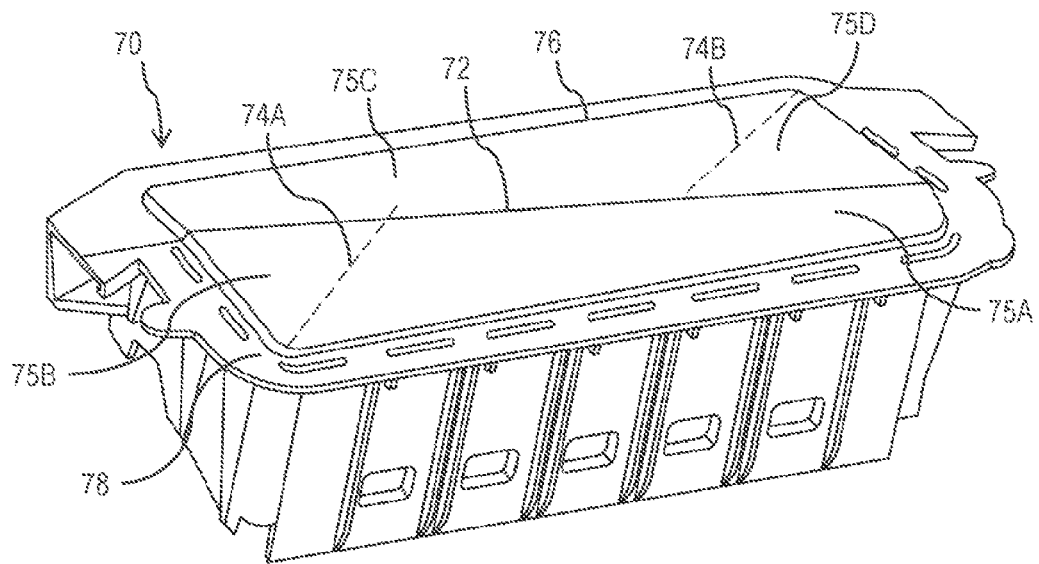
FIG. 7 is a perspective view of the chute portion of the passenger airbag assembly of FIG. 5.

FIG. 7 illustrates a perspective view of the chute 70 of the substrate layer 62 in accordance with the principles of the disclosed subject matter, with the chute 70 shown removed from the substrate surround 64 into which the chute 70 is inserted. The chute 70 can be approximately box-like in shape, and include a chute door 76 defining an upper surface of the chute 70. The chute 70 may include ribs or other structural features to ensure structural rigidity. In the present embodiment, the chute door 76 includes the chute seam 72 and the first and second chute perforations 74A,B. Furthermore, the chute seam 72 and the first and second chute perforations 74A,B partition the chute door 76 into four chute panels that are configured to open upward and outward upon deployment of the airbag (not shown), which is housed in the chute 70. The chute seam 72 separates the first and second chute panels 75A,B from the third and fourth chute panels 75C,D, serving as an initial area of separation in the chute door 76 when the airbag is deployed. Meanwhile, the first chute perforation 74A separates the first chute panel 75A from the second chute panel 75B, while the second chute perforation 74B separates the third chute panel 75C from the fourth chute panel 75D, serving as secondary areas of separation in the chute door 76 when the airbag is deployed. The manner in which the chute door 76 opens during airbag deployment is described below.

Figure 8:
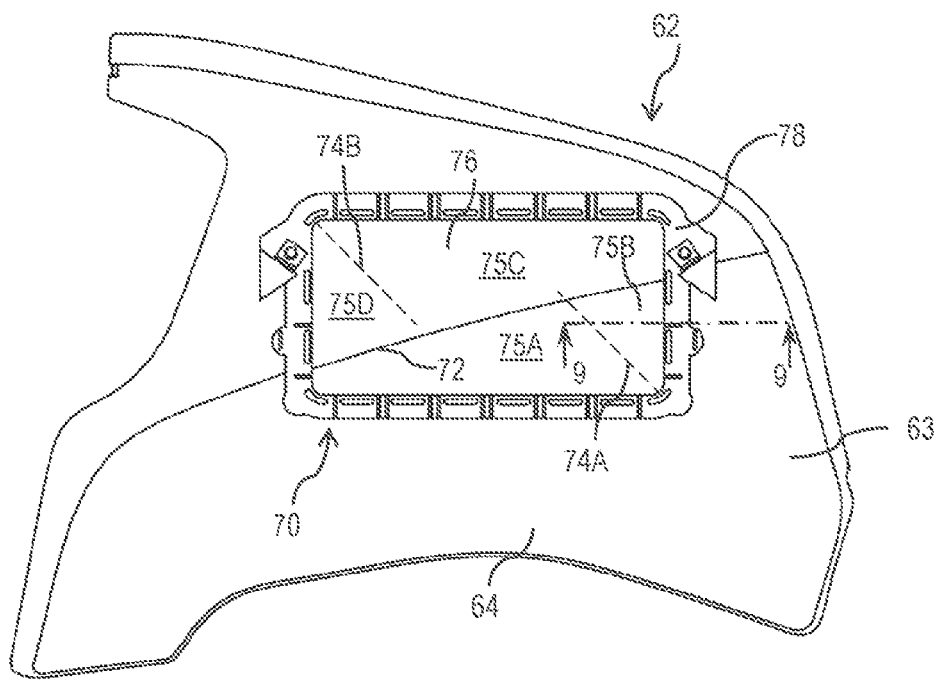
FIG. 8 is a bottom view of the substrate layer and the chute portion of the passenger airbag assembly.

In the present embodiment, chute 70 also includes a stepped portion surrounding the chute door 76 so that a main chute flange 78 is formed around the chute perimeter 71. The main chute flange 78 is configured to contact and engage an underside surface of the substrate surround 64 adjacent the substrate aperture 66 such that when the main chute flange 78 contacts the underside surface of the substrate surround 64, the chute door 76 is flush with an upper surface of the substrate surround 64 adjacent the substrate aperture 66, as shown in more detail in FIG. 9. FIG. 8 illustrates a plan view of an underside of the substrate layer 62 in accordance with the principles of the disclosed subject matter, the substrate layer 62 including the substrate surround 64 and the chute 70 positioned therein. The main chute flange 78 abuts the underside of the substrate surround 64 adjacent the substrate aperture 66 so as to ensure proper fitment of the chute 70 within the substrate surround 64.

Figure 9:
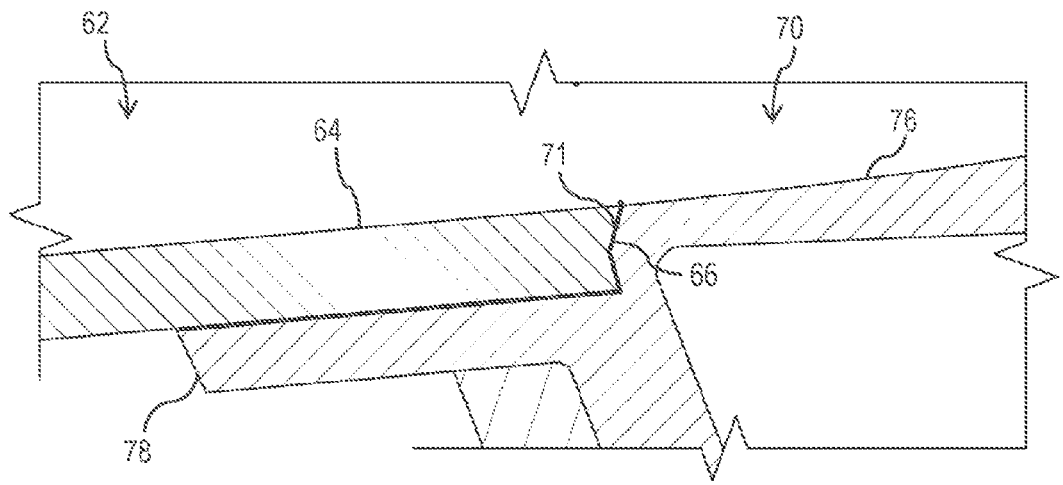
FIG. 9 is a side view a cross section of a part of the substrate layer and an adjacent part of the chute portion.

As previously described, FIG. 9 illustrates a side cross section view of a portion of the substrate layer 62 of FIG. 8. Particularly, FIG. 9 shows fitment between the chute 70 and the substrate surround 64 when the chute 70 is inserted through the substrate aperture 66 so as to engage the substrate surround 64. In the inserted state, the main chute flange 78 abuts a portion of the lower surface of the substrate surround 64 adjacent the substrate aperture 66, thereby aligning the chute door 76 with a portion of the upper surface of the substrate surround 64 adjacent the substrate aperture 66. Therefore, the chute door 76 and the substrate surround 64 are flush, and a tight fit is created between the chute perimeter 71 and edges of the substrate aperture 66. Fitment between the chute 70 and the substrate surround 64 is thus without gaps or steps at the chute door 76.

Figure 10:
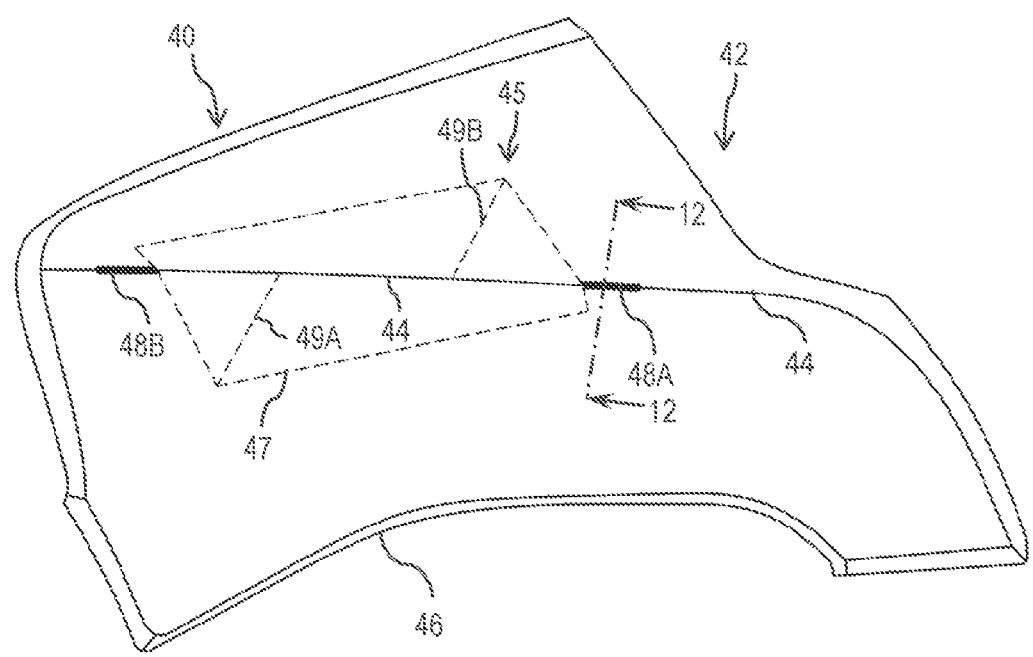
FIG. 10 is a perspective view of the substrate layer and the chute portion of the passenger airbag assembly.

FIG. 10 illustrates a perspective view of the airbag assembly 10 in accordance with the principles of the disclosed subject matter, including a chute area 45 disposed at a portion of the top layer 42 proximate the chute 70, and specifically the chute door 76, when the airbag assembly 10 is in an assembled state. The chute area 45 of the present embodiment includes an approximately rectangular portion of the top layer 42 aligned with the chute door 76 such that a chute area perimeter 47 traces the chute perimeter 71 defining outside edges of the chute door 76. As described above, the top seam 44 extends through the chute area 45, including first and second reinforced seams 48A,B disposed along the top seam 44, the first and second reinforced seams 48A,B being spaced from each other and further disposed at opposing sides of the chute area perimeter 47.

In the present embodiment, the first and second reinforced seams 48A,B extend along respective portions of the top seam 44, with the first and second reinforced seams 48A,B each extending from a portion of the top seam 44 within the chute area 45 to a portion of the top seam 44 outside of the chute area 45. The first and second reinforced seams 48A,B may be formed in any appropriate manner to maintain attachment between the first and second top panels 43A,B at the first and second reinforced seams 48A,B during airbag deployment, such as stitching, and specifically backstitching. As described below, a portion of the top seam 44 separates upon airbag deployment, and the first and second reinforced seams 48A,B ensure that the top seam 44 only separates at a portion within the chute area 45, restricted at both ends by the first and second reinforced seams 48A,B.

The top layer 42 of the airbag assembly 40 can also include first and second angled lines 49A,B that approximately trace the first and second chute perforations 74A,B of the chute 70, such that upon airbag deployment, the first and second angled lines 49A,B tear similarly to the first and second chute perforations 74A,B. Therefore, the first and second angled lines 49A,B extend from opposing portions of the chute area perimeter 47 to the top seam 44. The first and second angled lines 49A,B may not correspond to weakened or perforated portions of the top layer 42, but rather to portions adjacent those configure to tear in other layers. Thus, despite the top layer 42 not being weakened along the first and second angled lines 49A,B, the top layer 42 is still configured to separate along the first and second angled lines 49A,B due to tearing of adjacent attached layers.

Figure 11:
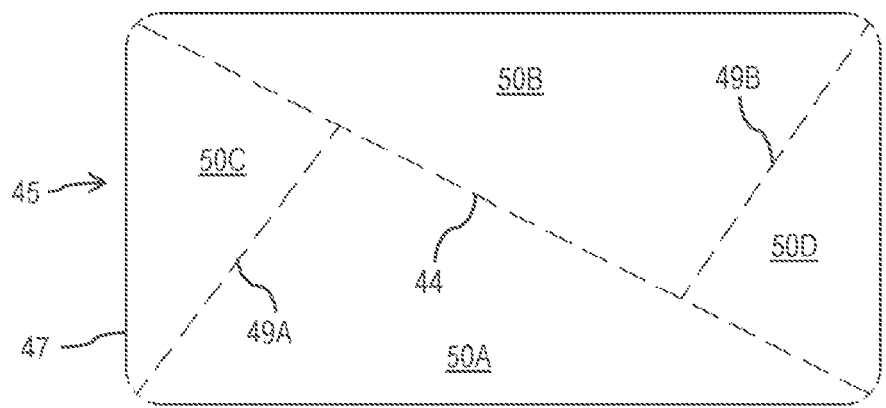
FIG. 11 is a top view of the chute portion of the passenger airbag assembly of FIG. 11.

FIG. 11 illustrates a plan view of the chute area 45 in accordance with the principles of the disclosed subject matter. The chute area 45 of the present embodiment is partitioned by the top seam 44 extending through an intermediate portion of the chute area 45, as well as the first and second angled lines 49A,B extending from respective portions of the chute area perimeter 47 to the top seam 44. As shown, the top seam 44 and first and second angled lines 49A,B partition the chute area 45 into four approximately right-angled triangles that together form the rectangular shape of the chute area 45. Alternatively, the chute area 45 may be partitioned into a greater or fewer number of triangles, and the triangles can also be acute or obtuse.

As shown in more detail in FIG. 13, and described below, the chute area 45 partitions include first and second top sections 50A,B which are separated by the top seam 44, and third and fourth top sections 50C,D which are separated from the first and second top sections 50A,B, respectively, by the first and second angled lines 49A,B. Upon airbag deployment, the top seam 44 is configured to tear before the first and second angled lines 49A,B so that the first and third top sections 50A,C separate from the second and fourth top sections 50B,D along the top seam 44. Following separation of the first and second top panels 43A,B at the chute area 45, the first and second angled lines 49A,B tear so that the first and third top sections 50A,C separate from one another, as do the second and fourth top sections 50B,D. Once the top seam 44 and the first and second angled lines 49A,B have torn, the first, second, third and fourth top sections 50A,B,C,D become separated flaps that fold outward and away from the chute area 45, the first, second, third and fourth top sections 50A,B,C,D being hinged at respective portions of the chute area perimeter 47. In this configuration, the hinged portions of the chute area perimeter 47 are living hinges, however other configurations of hinges may be appropriate.

Figure 12:
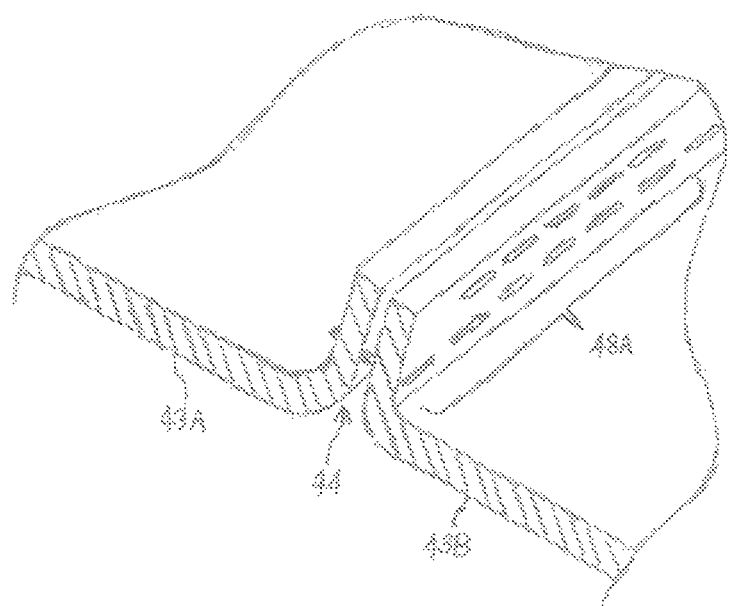
FIG. 12 is a perspective view of an underside of part of the cover panel of the passenger airbag assembly.

FIG. 12 illustrates a perspective cross section view of an underside of the first reinforced seam 48A of the airbag assembly 40 of FIG. 10. The first reinforced seam 48A of the present embodiment is disposed along opposing edges of the first and second top panels 43A,B where the edges are brought together to be joined. The first reinforced seam 48A may be backstitched with thread or any other appropriate stitching material, or may alternatively be stitched with another method. Additionally, other attachment methods such as use of adhesives or attachment fixtures may be used to attach the first and second top panels 43A,B together at the first reinforced seam 48A. Although not specifically shown, the second reinforced seam 48B may be configured similar to the first reinforced seam 48A including the application of backstitching. In the present embodiment, the backstitching at the first and second reinforced seams 48A,B serves to prevent the first and second top panels 43A,B from separating along the top seam 44 at the first and second reinforced seams 48A,B.

Figure 13:
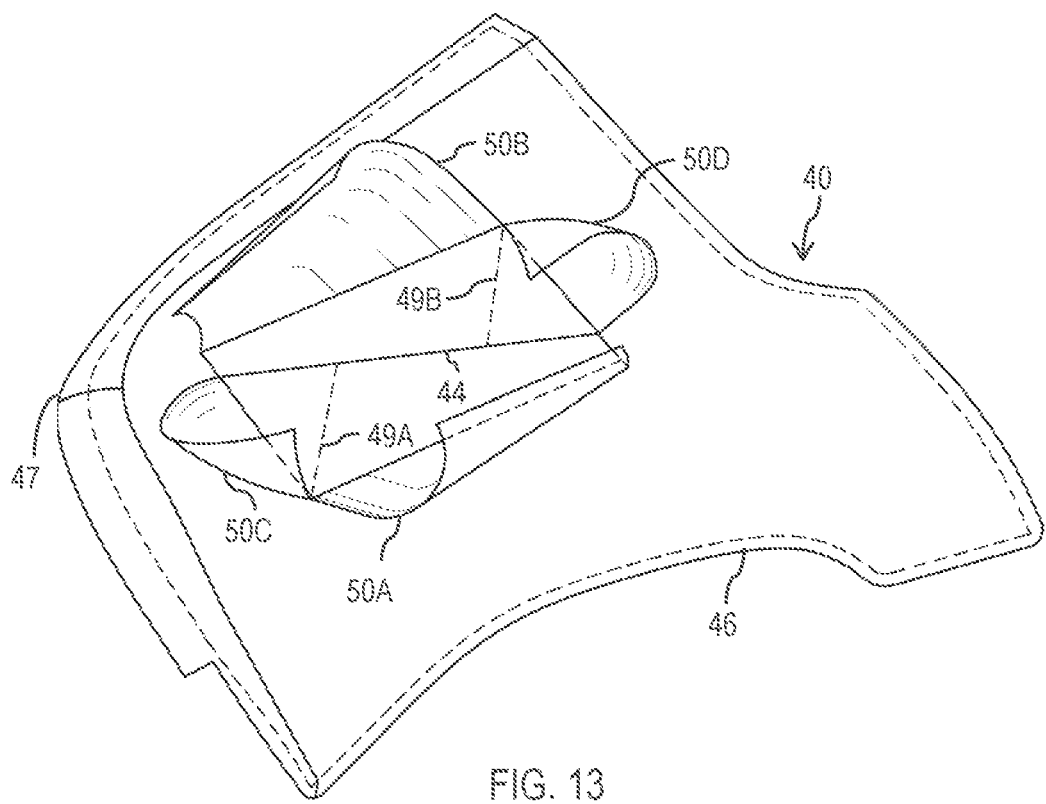
FIG. 13 is a perspective view of the substrate layer and the chute portion of the passenger airbag assembly, with the chute portion shown in a deployed state.

FIG. 13 illustrates a perspective view of the airbag assembly 40 in accordance with the principles of the disclosed subject matter. In FIG. 13, the chute area 45 is shown in a state following airbag deployment wherein the top seam 44 and the first and second angled lines 49A,B have torn and the first, second, third and fourth top sections 50A,B,C,D have folded outwards and away with the deployed chute door 76. The aforementioned elements are shown in configurations prior to and after deployment of the airbag to illustrate how they transition between the two states (undeployed and deployed). The order in which the aforementioned elements tear and fold is described above, however alternate configurations of the elements may warrant a varied deployment order.

In the present embodiment, airbag deployment initiates a force within the chute 70 outward against an inner surface of the chute door 76. This force tears the chute seam 72, followed by the first and second chute perforations 74A,B, which thereby are pushed outward against a lower surface of the spacer layer 52, which is described below. The spacer layer 52 is subsequently pushed outward by the expansion of the airbag such that the force is transferred to a lower surface of the top layer 42. Once transferred to the top layer 42, that force causes the top seam 44 and the first and second angled lines 49A,B to tear as described above, and the first, second, third and fourth top sections 50A,B,C,D to fold outwards and away from the deployed chute door 76. In this way, airbag deployment facilitates the tearing and unfolding of various layers of the airbag assembly 40, including the substrate layer 62, the spacer layer 52, and the top layer 42.

Figure 14:
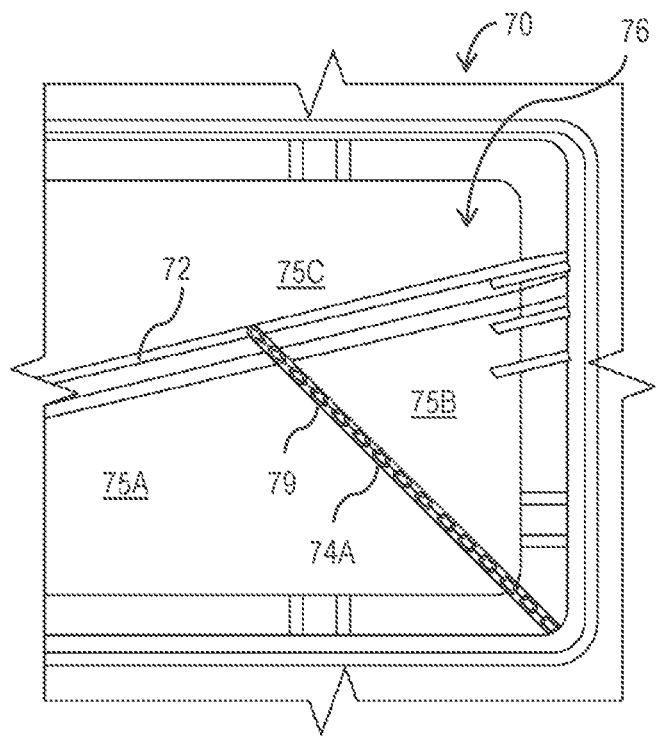
FIG. 14 is a plan view of a bottom side of an airbag door of the chute portion.

FIG. 14 illustrates a partial plan view of an underside of the chute 70 of the airbag assembly 40 in accordance with the principles of the disclosed subject matter. Specifically, FIG. 14 shows an underside of the chute door 76, including the chute seam 72 and the first chute perforation 74A. The first chute perforation 74A can be formed as pointed elliptical perforations 79 spaced along the first chute perforation 74A so as to be configured to propagate tearing of the first chute perforation 74A. The elliptical perforations 79 may be oriented lengthwise, with pointed ends aligned along the first chute perforation 74A. Alternatively, the elliptical perforations 79 may be oriented widthwise. Diamond shaped perforations may instead be used in place of the elliptical perforations 79 in some embodiments. A number of elliptical perforations 79 may vary depending on the ease with which the first chute perforation 74A can tear. The elliptical perforations 79 serve to provide surrounding elements, such as the spacer layer 52, with enough structural support to prevent warping of portions adjacent the first chute perforation 74A. Additionally, the elliptical perforations 79 described above may be included in the second chute perforation 74B, as well as any other tear seams or lines meant to tear in response to airbag deployment.

Figure 15:
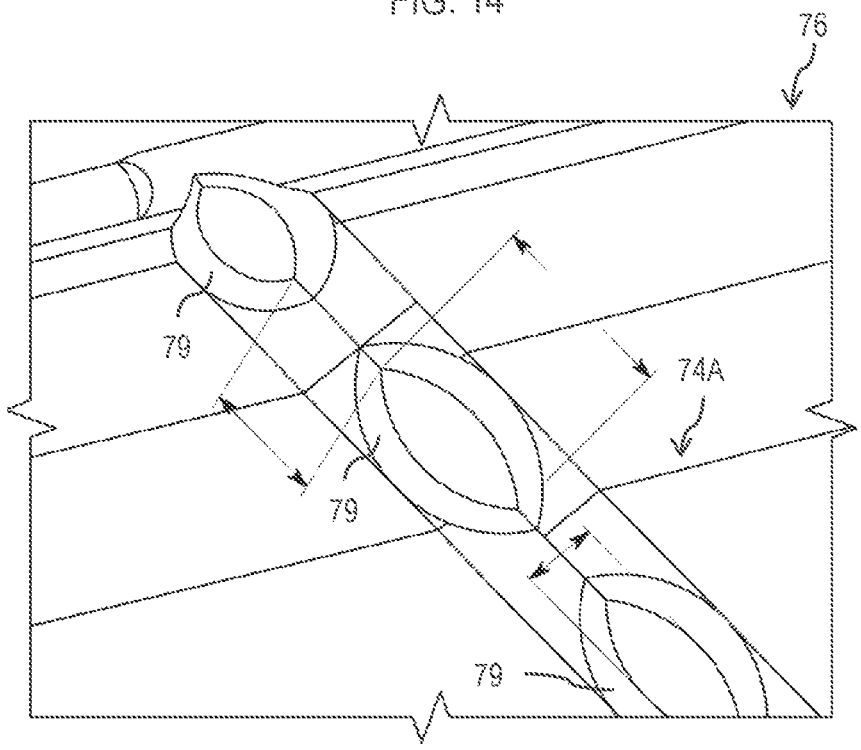
FIG. 15 is a plan view of the bottom side of the airbag door of FIG. 14

FIG. 15 illustrates a partial plan view of the chute door 76 in accordance with the principles of the disclosed subject matter. Specifically, FIG. 15 shows part of the first chute perforation 74 A including the elliptical perforations 79 described above. Spacing between consecutive elliptical perforations 79 can vary or remain constant, and the length and width of each elliptical perforation 79 can also vary depending on the appropriate tear propensity of the first chute perforation 74A. Additionally, configurations of the elliptical perforations 79 including dimensional variances can be applied to the second chute perforation 74B, or any other tear seam or line included in the airbag assembly 40.

Figure 16:
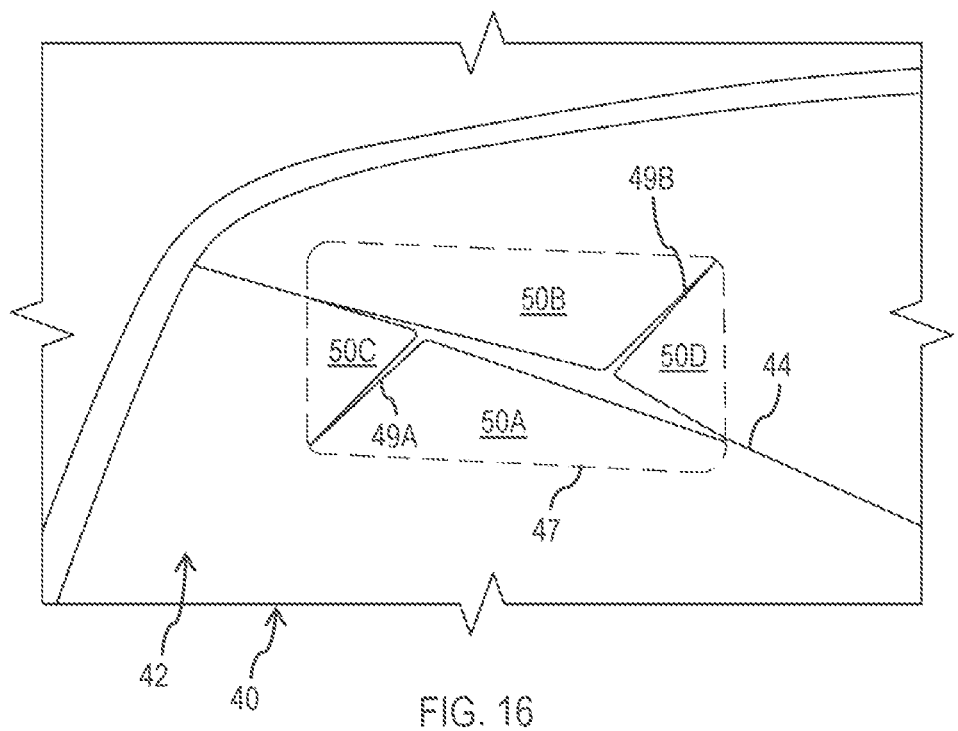
FIG. 16 is a plan view of a top side of the substrate layer and the chute portion of the passenger airbag assembly, the chute portion shown in a partially deployed state.

FIG. 16 illustrates a partial plan view of the airbag assembly 40 in accordance with the principles of the disclosed subject matter, with airbag assembly 40 shown in a partially deployed state. Specifically, FIG. 16 shows initial tearing of the top seam 44 and the first and second angled lines 49A,B of the top layer 42, and corresponding separation of the first, second, third and fourth top sections 50A,B,C,D from one another. As described above, airbag deployment causes the top seam 44 to tear, followed by the first and second angled lines 49A,B. Consequently, the first and second top panels 43A,B separate from each other first. Then, the first and third top sections 53A,C separate from each other, as do the second and fourth top sections 53B,D. Alternate separation configurations may be appropriate depending on varying airbag deployment.

Figure 17:
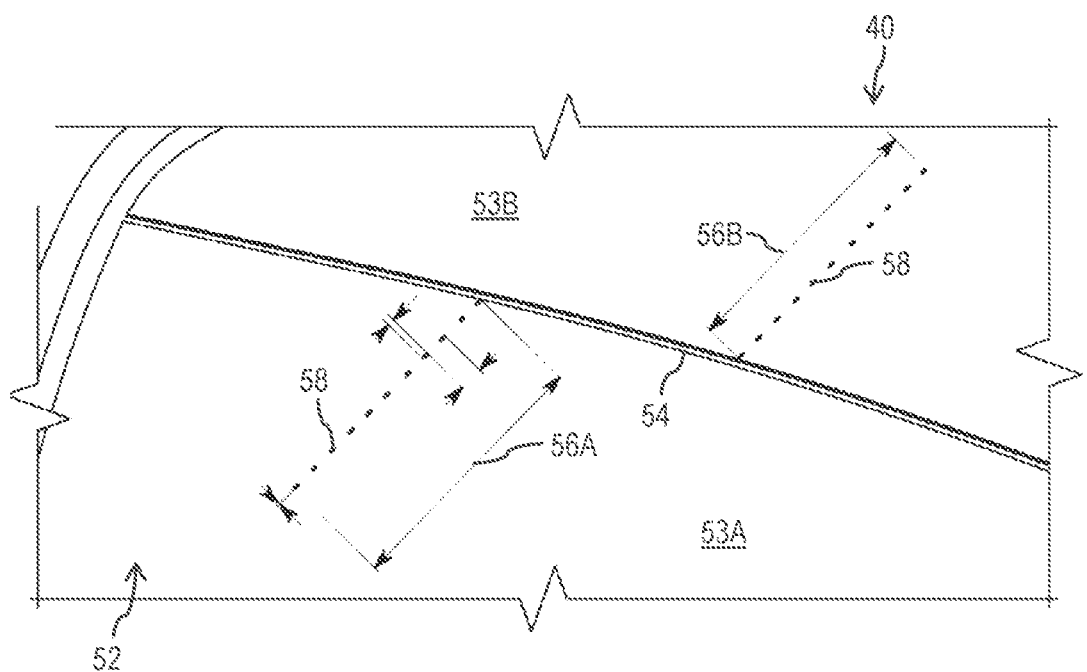
FIG. 17 is a plan view of a top side of the spacer layer of the passenger airbag assembly.

FIG. 17 illustrates a partial perspective view of the spacer layer 52 of the airbag assembly 40 in accordance with the principles of the disclosed subject matter. In the present embodiment, the spacer layer 52 includes a first spacer line 56A and a second spacer line 56B extending from respective portions of the seam gap 54. In some embodiments, the first and second spacer lines 56A,B may not correspond to weakened or perforated portions of the spacer layer 52, but rather to portions adjacent those configured to tear in other layers. Thus, despite the spacer layer 52 not being weakened along the first and second spacer lines 56A,B, the spacer layer 52 may still be configured to separate along the first and second spacer lines 56A,B due to tearing of adjacent attached layers, as will be described below.

In other embodiments, the first and second spacer lines 56A,B further include spacer perforation holes 58. The first and second spacer lines 56A,B, including the spacer perforation holes 58, serve to provide surrounding elements with enough structural support to prevent warping of portions adjacent the spacer layer 52. The first and second spacer lines 56A,B are configured to tear upon deployment of the airbag such that after the first and second spacer panels 53A,B separate at the seam gap 54, the spacer perforation holes 58 being configured to propagate tearing in an approximately linear manner of the first and second spacer lines 56A,B. Particularly, the first and second spacer lines 56A,B initially tear at the spacer perforation holes 58 nearest the seam gap 54, with adjacent spacer perforation holes 58 propagating the tears up to the last spacer perforation holes 58 farthest from the seam gap 54. The first and second spacer lines 56A,B, in combination with the seam gap 54, allow the spacer layer 52 to separate into panels similarly to both the chute door 76 and the top layer 42 as a result of the airbag deploying. The first and second spacer lines 56A,B of the present embodiment therefore extend at similar angles from the seam gap 54 as corresponding tear seams/lines of adjacent layers of the airbag assembly 40 such as the top layer 42 and the substrate layer 62.

In the present embodiment, the spacer perforation holes 58 may be of varying dimensions in length, width and shape, and may be spaced apart by a multitude of distances. Also, the spacer perforation holes 58 can extend an entire or partial length of the first and second spacer lines 56A,B. The spacer perforation holes 58 serve to initiate tearing of the first and second spacer lines 56A,B while providing support for the spacer layer 62 so as to maintain its shape and structure.

III. Alternative Embodiments

In the disclosed embodiment, various structures are applied to a passenger airbag (PAB) of a vehicle. However, the disclosed structures may alternatively be applied to or modified to cover any type of airbag assembly, including assemblies for other front airbags such as steering wheel airbags, knee airbags, and other types of side airbags such as torso airbags and side curtain airbags.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

In the disclosed exemplary embodiments, the airbag assembly is included in the dashboard of the vehicle. However, the airbag assembly can be included in any component of the vehicle capable of deploying an airbag, such as the steering wheel, door panels, ceiling liner, pillars, etc.

Embodiments of the airbag assembly are also intended to cover material layers that are configured to separate and tear apart in a variety of ways, such as by the inclusion of weakened thread in burst stitching as disclosed. Specifically, the tear line so described can instead incorporate construction similar to that of the angled tear lines as described above.

Embodiments are also intended to include or otherwise cover methods of using and methods of manufacturing any or all of the elements disclosed above. The methods of manufacturing include or otherwise cover processors and computer programs implemented by processors used to design various elements of the airbag assembly disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An assembly for housing and covering a vehicle airbag in an un-deployed state, the assembly comprising:

a hollow housing that defines an interior that is configured to house the airbag in the un-deployed state, the housing including a housing door that includes a linearly extending primary weakened portion spanning longitudinally opposing ends of the housing and dividing the housing door into opposing first and second sides, the housing door also including a pair of angled seams that each extend proximate the primary weakened portion to a location adjacent opposing corners of the door, a first one of the angled seams extending along the first side and terminating at the primary weakened portion at a first location and a second one of the angled seams extending along the second side and terminating at the primary weakened portion at a second location spaced apart from the first location;

an intermediate layer disposed over and joined to the housing door so that the intermediate layer is configured to separate along separation portions adjacent the primary weakened portion and the pair of angled seams; and an exterior layer disposed over and joined to the intermediate layer so that the exterior layer is configured to separate along separation portions of the intermediate layer.

2. The assembly according to claim 1, wherein the primary weakened portion extends at an angle relative to a longitudinal direction of the housing.

3. The assembly according to claim 1, wherein the exterior layer includes a stitched portion disposed directly over at least a section of the primary weakened portion of the housing door.

4. The assembly according to claim 1, wherein the primary weakened portion of the housing door spans edges of the housing door at locations proximate opposing corners of the housing door.

5. The assembly according to claim 1, wherein the primary weakened portion of the housing door is defined by a linearly extending region that has a thickness that is less than a thickness of the remainder of the housing door, such that a channel is defined in the housing door that extends along the primary weakened portion.

6. The assembly according to claim 1, wherein each of the pair of angled seams of the housing door is defined by perforations formed in the housing door.

7. The assembly according to claim 6, wherein each of the perforations forming each of the angled seams has opposing pointed longitudinal ends.

8. The assembly according to claim 7, wherein each of the perforations forming each of the angled seams is generally elliptically shaped with opposing pointed longitudinal ends.

9. The assembly according to claim 7, wherein each of the perforations forming each of the angled seams is generally diamond shaped with opposing pointed longitudinal ends.

10. The assembly according to claim 1, wherein the intermediate layer is configured as a unitary sheet.

11. The assembly according to claim 10, wherein the intermediate layer includes perforations that extend over and along the primary weakened portion of the housing door.

12. The assembly according to claim 3, wherein the intermediate layer includes two separate sheets that are separated by a gap that extends over and along the primary weakened portion of the housing door.

13. The assembly according to claim 12, wherein the stitched portion of the exterior layer includes a burst stitch formed using a relatively weak thread such that the burst stitch is configured to tear apart under a predetermined force, that the burst stitch being at least partially disposed within the gap of the intermediate layer.

14. The assembly according to claim 1, wherein the intermediate layer includes two separate sheets that are stitched together so that the stitching extends over and along the primary weakened portion of the housing door.

15. The assembly according to claim 13, wherein the stitched portion includes a backstitch portion formed using a relatively strong thread compared to the burst stitch such that the backstitch is configured to withstand the predetermined force without tearing, the backstitch portion being disposed at each of opposing ends of the burst stitch.

16. The assembly according to claim 15, wherein the exterior layer defines an outer surface that is substantially uniform at locations disposed directly over the pair of angled seams of the housing door.

17. A vehicle dashboard assembly, comprising:
a center console;
a dashboard that includes a center dashboard portion disposed above the center console and a passenger dashboard portion that includes an airbag assembly, the airbag assembly including an airbag and a housing assembly that is configured to house and cover the airbag in an un-deployed state, the airbag assembly including:
a hollow housing that defines an interior that is configured to house the airbag in the un-deployed state, the housing including a housing door that includes a linearly extending primary weakened portion spanning longitudinally opposing ends of the housing and dividing the housing door into opposing first and second sides, the housing also including a pair of angled seams that each extend proximate the primary weakened portion to a location adjacent opposing corners of the door, a first one of the angled seams extending along the first side and terminating at the primary weakened portion at a first location and a second one of the angled seams extending along the second side and terminating at the primary weakened portion at a second location spaced apart from the first location;
an intermediate layer disposed over and joined to the housing door so that the intermediate layer is configured to separate along separation portions adjacent the primary weakened portion and the pair of angled seams; and
an exterior layer disposed over and joined to the intermediate layer so that the exterior layer is configured to separate along separation portions of the intermediate layer.

18. The vehicle dashboard assembly according to claim 17, wherein the primary weakened portion extends at an angle relative to a longitudinal direction of the housing.

19. The vehicle dashboard assembly according to claim 17, wherein the exterior layer includes a stitched portion disposed directly over at least a section of the primary weakened portion of the housing door.

20. The vehicle dashboard assembly according to claim 19, wherein the stitched portion of the exterior layer includes a burst stitch formed using a relatively weak thread such that the burst stitch is configured to tear apart under a predetermined force, that the burst stitch being at least partially disposed within the gap of the intermediate layer.

21. The vehicle dashboard assembly according to claim 20, wherein the stitched portion includes a backstitch portion formed using a relatively strong thread compared to the burst stitch such that the backstitch is configured to withstand the predetermined force without tearing, the backstitch portion being disposed at each of opposing ends of the burst stitch.

22. The vehicle dashboard assembly according to claim 17, wherein the primary weakened portion of the housing door spans edges of the housing door at locations proximate opposing corners of the housing door.

23. The vehicle dashboard assembly according to claim 17, wherein the primary weakened portion of the housing door is defined by a linearly extending region that has a thickness that is less than a thickness of the remainder of the housing door, such that a channel is defined in the housing door that extends along the primary weakened portion.

24. The vehicle dashboard assembly according to claim 17, wherein each of the pair of angled seams of the housing door is defined by perforations formed in the housing door.

25. The vehicle dashboard assembly according to claim 24, wherein each of the perforations forming each of the angled seams has opposing pointed longitudinal ends.

26. The vehicle dashboard assembly according to claim 25, wherein each of the perforations forming each of the angled seams is generally elliptically shaped with opposing pointed longitudinal ends.

27. The vehicle dashboard assembly according to claim 25, wherein each of the perforations forming each of the angled seams is generally diamond shaped with opposing pointed longitudinal ends.

28. The vehicle dashboard assembly according to claim 17, wherein the intermediate layer is configured as a unitary sheet.

29. The assembly according to claim 28, wherein the intermediate layer includes perforations that extend over and along the primary weakened portion of the housing door.

30. The vehicle dashboard assembly according to claim 17, wherein the intermediate layer includes two separate sheets that are separated by a gap that extends over and along the primary weakened portion of the housing door.

31. The vehicle dashboard assembly according to claim 17, wherein the intermediate layer includes two separate sheets that are stitched together so that the stitching extends over and along the primary weakened portion of the housing door.

32. The vehicle dashboard assembly according to claim 17, wherein the exterior layer defines an outer surface that is substantially uniform at locations disposed directly over the pair of angled seams of the housing door.

33. A method of manufacturing an assembly for housing and covering a vehicle airbag in an un-deployed state, the method comprising:
  configuring a hollow housing to define an interior capable of housing the airbag in the un-deployed state;
  forming the housing to include a housing door having a linearly extending primary weakened portion spanning longitudinally opposing ends of the housing and dividing the housing door into opposing first and second sides and extending at an angle relative to a longitudinal direction of the housing, and such that the housing door also includes a pair of angled seams that each extend proximate the primary weakened portion to a location adjacent opposing corners of the door, a first one of the angled seams extending along the first side and terminating at the primary weakened portion at a first location and a second one of the angled seams extending along the second side and terminating at the primary weakened portion at a second location spaced apart from the first location;
  disposing an intermediate layer over the housing door;
  disposing an exterior layer over the intermediate layer; and
  forming a stitched portion in the exterior layer directly over at least a section of the primary weakened portion of the housing door.

* * * * *